# 2,735,822

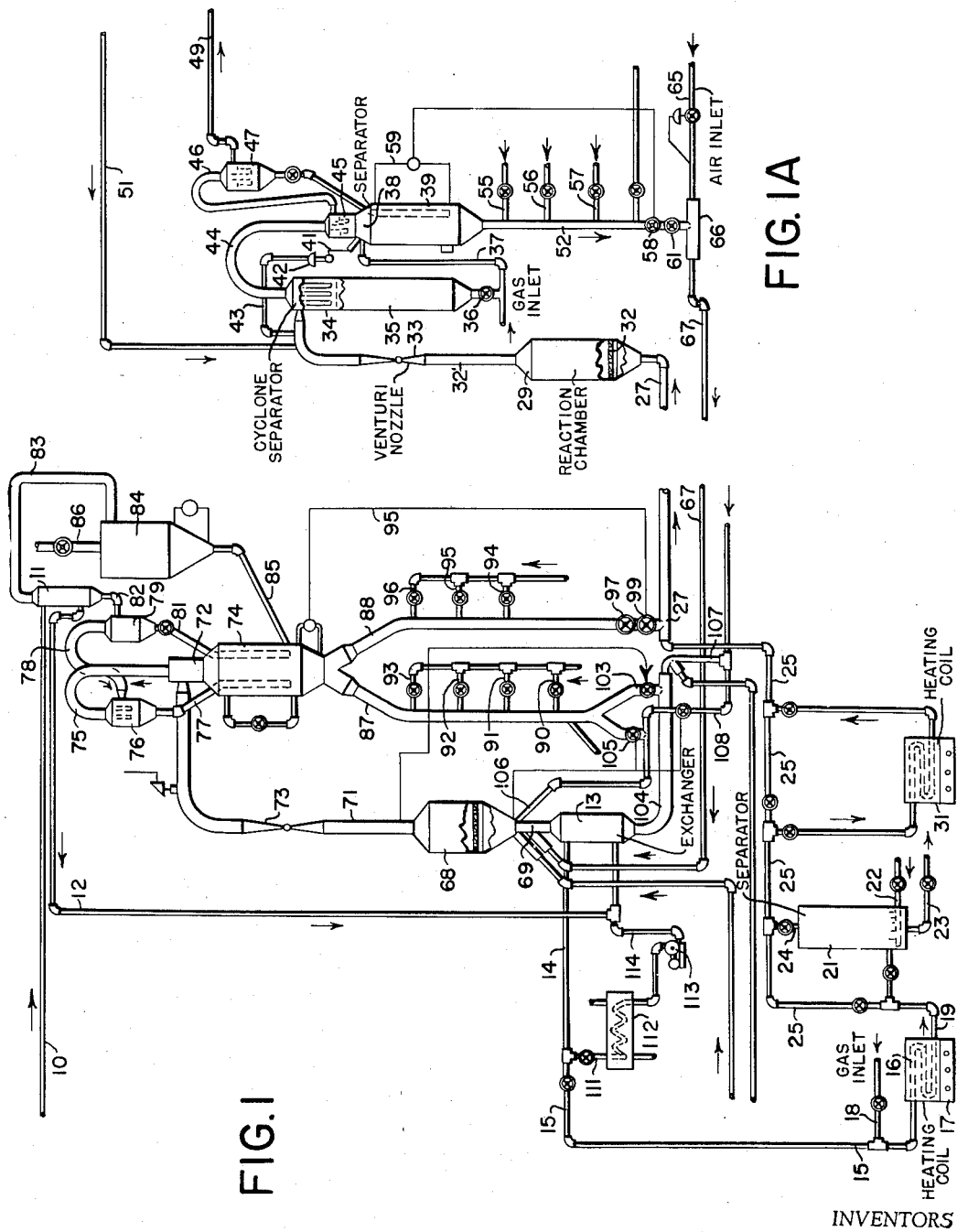
Feb. 21, 1956     D. L. CAMPBELL ET AL     2,735,822
METHOD OF AND APPARATUS FOR CONTACTING SOLIDS AND GASES
Original Filed Oct. 5, 1940
INVENTORS
DONALD L. CAMPBELL,
HOMER Z. MARTIN AND
CHARLES W. TYSON
BY *George J. Silhavy*
ATTORNEY

METHOD OF AND APPARATUS FOR CONTACTING SOLIDS AND GASES

Donald L. Campbell, Short Hills, Homer Z. Martin, Cranford, and Charles Wesley Tyson, Summit, N. J., assignors to Esso Research and Engineering Company, a corporation of Delaware Application August 20, 1946, Serial No. 691,862, which is a division of application Serial No. 359,854, October 5, 1940, now Patent No. 2,541,803, dated October 19, 1948. Divided and this application January 21, 1955, Serial No. 483,200

7 Claims. (Cl. 252—417)

This invention relates to a method of and apparatus for contacting solid material in finely-divided form with gaseous products and pertains more particularly to a process and apparatus in which solid material in finely-divided form is intermingled in a gaseous medium and the resulting mixture passed through a treating zone.

The invention finds application in industrial processes of various types wherein finely-divided solids are intermixed with a gaseous or vaporous stream in a continuous manner for the purpose of bringing about physical or chemical changes in the gases or solids, or both.

As examples of processes wherein solids are acted upon by gases in which some phases of the invention may be adapted are: the low temperature carbonization of coal, production of water gas from coal, distillation of wood, oil shale, or coal, treatment of ores, such as reduction and roasting of various metallic ores, drying of solids, and the like.

As examples of non-catalytic processes wherein gases are acted upon by the solids and in which certain phases of the invention find application are: oxidation of gases by various solid oxides, separation and purification of gases by solid absorbents, such as activated carbon and oxide gels as in air conditioning, recovery of vapors from gases, as in the recovery of solvents from gases in dry cleaning and painting establishments, recovery of gasoline constituents from natural gas, casinghead gas or cracked refinery gas, and the like, separation of gases or vapors by selective adsorption as in selective removal of higher boiling hydrocarbons from lower boiling hydrocarbons.

A third class of processes in which the invention finds application is that in which the finely-divided solid acts as a catalyst for bringing about gas reactions. As examples may be mentioned various organic reactions involving oxidation, reduction, chlorination, hydration, dehydration, and the like, and more particularly various hydrocarbon reactions wherein solid catalysts or treating agents may be employed, such as in cracking, hydrogenation, dehydrogenation, polymerization, alkylation, dealkylation, isomerization, aromatization, desulfurization, synthesis of hydrocarbons from carbon monoxide and hydrogen, and the like.

The invention in its more specific phases is especially directed to processes in which the solid material after passing through the treating zone is separated from the gaseous or vaporous stream and again returned to the treating zone. In particular, it has application to processes in which it is desirable to (1) reactivate or regenerate catalyst powders before returning the same to the treating zone, as in the catalytic conversion of hydrocarbon oils or vapors, or (2) rapidly add or extract heat from the treating zone in which strong exothermic or endothermic reactions are carried out.

The present invention has for its general object the provision for a method of and apparatus for contacting solids with gases, involving mixing finely-divided solids in a gaseous stream and carrying the resulting mixture through a treating zone in a continuous manner which is more simple and economical to construct and operate and which will not be subject to the operating difficulties heretofore experienced in processes of this general nature.

Other more specific objects and advantages of the invention will be made apparent from the more detailed description hereinafter.

The invention in its entirety comprehends a complete unitary process involving reaction and regenerative treatment of the powdered material in a closed circuit and also embraces certain combinations and sub-combinations of process and elements as set forth in the claims hereinafter.

For illustrative purposes the invention will be described with specific reference to the catalytic cracking of petroleum oils in which it has been found to be particularly applicable, it being understood from the above disclosure that the invention in its broader phases will have a more general application.

For a fuller understanding of the invention, reference will now be made to the accompanying drawing, wherein:

Fig. 1 is a diagrammatic view in elevation of a part of the apparatus forming a part of the present invention; and Fig. 1-A is a continuation of Fig. 1 showing the remainder of the apparatus.

Referring to Fig. 1 of the drawing, reference character 10 designates a charge line through which the oil to be cracked is introduced into the system. This oil may be a clean condensate stock such as a gas oil or it may be residual stock such as topped or reduced crude.

The oil introduced into the system through line 10 is first passed through a heat exchanger 11 wherein the oil passes in heat exchange relation with spent regenerating gases as hereinafter described. The oil from heat exchanger 11 passes through line 12 to a second heat exchanger 13 where it is further heated by heat exchange with powdered catalytic material withdrawn from the regenerating zone later described. The oil, after passing through heat exchanger 13, is transferred through lines 14 and 15 to a vaporizing coil 16 located in furnace 17 where it is rapidly heated to a temperature sufficient to vaporize at least a substantial portion of the oil. If desired, steam or other stripping gas may be introduced into the oil through line 18 prior to or during passage through the vaporizing coil 16 to assist in the vaporization of the oil.

Products from the vaporizing coil 16 may pass through transfer line 19 to a separator 21 for separating vapors from unvaporized residue. Additional steam or other stripping agent may be introduced into the separator 21 through line 22. Unvaporized residue segregated in the separator 21 may be removed therefrom through line 23. Vapors liberated in the separator 21 pass overhead through line 24.

In cases where the oil to be treated is a clean condensate stock, the separator 21 may be omitted or the oil from the vaporizing coil 16 may by-pass the separator 21 through line 25.

The vapors liberated in the separator 21 constitute the charging stock to the catalytic cracking unit. These vapors may be passed through lines 24 and 25 to a conduit 27 wherein the vapors intermix with powdered catalytic material introduced into the conduit as later described. The resulting dispersion of oil vapors and powdered material passes through the conduit 27 to a cracking vessel 29. (See Fig. 1-A.)

In some cases it is desirable to further heat the oil vapors from the separator 21. In such case vapors from line 24 may be passed through a super-heating coil 31 or other heating device for imparting the desired heat to the vapors.

The amount of catalyst introduced into the oil vapors passing to the reaction chamber 29 may vary over an extended range depending upon a number of factors, such as the characteristics of the oil to be cracked, the activity of the catalyst, and the amount of conversion desired. In general, the amount of catalyst so introduced may be between the limits of from .5 to 20 parts of catalyst per part of oil by weight.

The bottom section of the reaction chamber may be provided with a perforated plate 32 through which the dispersion passes. The purpose of the plate is to distribute the dispersion uniformly through the full cross-sectional area of the cracking vessel.

The cracking vessel is preferably made of such dimensions that the desired conversion is obtained at relatively low velocities, such as from .5 to 10 feet per second. Because of the relatively low velocities at which the gases flow through the circuit, the powder tends to settle out of the gas. As a result there is a considerable slippage between the solid particles and the vapors so that continuous intermixing of the gas and solids is attained. As a result, the time of residence of the solid particles within the cracking zone in such case is materially greater than the time of residence of the oil vapors. For example, whereas the time of residence of the oil vapors may be of the order of from 5 to 50 seconds, the time of residence of the solid particles within the cracking zone may be of the order of from 20 seconds to an hour or more. As a result, a smaller and more compact reactor may be used or the amount of powdered material necessary to be circulated is reduced for a cracking unit of given capacity.

The velocity of the oil vapors passing through the cracking zone, however, is preferably sufficient to prevent complete settling of the powder so that the cracked vapors may be utilized for removing the powdered material from the cracking zone.

The suspension of oil vapors and catalyst, after passing through the cracking vessel, is removed therefrom through line 32' having a Venturi nozzle 33 and is passed to a primary cyclone separator 34 wherein the bulk of the powder is removed from the oil vapors. The catalyst separated in the primary cyclone separator 34 is discharged into the bottom section 35 which is preferably of sufficient size to provide a reserve supply sufficient to last from 5 to 15 minutes. The catalyst discharges from hopper 35 through a suitable valve 36 into a stream of stripping gas such as steam passing through line 37 to a cyclone separator 38 forming the upper section of a second catalyst hopper 39. The steam separated in the separator 38 is withdrawn therefrom through line 41 and is passed by means of steam injector 42 to the inlet side of the primary cyclone separator 34 through line 43.

The reintroduction of the catalyst into a stream of steam in line 37 is primarily for the purpose of removing any volatile oil constituents which may be retained within the catalyst after the separation. In lieu of steam other inert gas such as nitrogen, carbon dioxide, spent combustion gases and the like may be used.

Vapors separated in the primary cyclone separator 34, having the bulk of the powdered material removed therefrom, pass through line 44 to a secondary cyclone separator 45 wherein the vapors are subjected to further purification. The secondary cyclone separator 45 may be conveniently built into the upper section of the catalyst hopper 39. Catalyst separated in the secondary cyclone separator 45 may then charge directly into the catalyst hopper 39. Cracked vapors from the secondary cyclone separator 45 are passed through line 46 to a tertiary cyclone separator 47 wherein further removal of powdered material from the cracked products is obtained. The catalyst separated in the tertiary cyclone separator 47 discharges through line 48 having the end thereof terminating in the bottom section of the catalyst hopper 39 at a point below the level of catalyst maintained therein. Cracked vapors are removed from the tertiary cyclone separator 47 through line 49 and passed to a suitable fractionating or rectifying system (not shown) for segregation of the desired motor fuel products from insufficiently cracked constituents and from normally gaseous constituents. The fractionating or rectifying system may be of any conventional design and in the interest of simplicity has not been shown in the drawing.

While we have shown a series of three cyclone separators operating in series for separating the powdered catalyst from the vapors, it will be understood that other equivalent devices for effecting separation of solids from gases may be used if desired.

In cases where the catalyst is not completely removed from the oil vapors prior to passing the same to the fractionating tower, a narrow fraction of the initial condensate formed in the fractionating tower containing the residual catalyst may be segregated from the remainder by means of a trapout tray or the like and recycled through line 51 to the inlet side of the primary cyclone separator 34.

Catalyst collected in the hopper 39 discharges into a vertical standpipe 52 of sufficient height to feed the catalyst into a stream of regenerating gas under a pressure at least sufficient to overcome the pressure drop through the regenerating circuit.

One of the important phases of the present invention is the provision of a column of catalyst of a height sufficient to produce a bottom pressure which will feed the catalyst into the stream of regenerating gas.

It has been found that under properly controlled conditions the powdered material can be made to flow as a fluid and to conform with many of the physical laws thereof. In order to insure the material flowing as a fluid, provision is usually necessary to prevent the powdered material from packing in the standpipe 52. This can be readily accomplished by the introduction of a small amount of a fluidizing gas at one or more spaced points along the standpipe through lines 55, 56 and 57.

The fluidizing gas introduced through lines 55, 56 or 57 is preferably an inert gas such as steam, carbon dioxide, spent combustion gas, nitrogen or the like.

The lower end of the standpipe 52 is provided with a suitable valve 58 for regulating the amount of catalyst discharging therefrom. A conventional slide valve having an apertured slide which can be adjusted to regulate the side of the orifice through which the powder passes is suitable for this purpose, although other types of valves may be used. This valve may be operated manually or automatically, such as by the level in the hopper 39. In the drawing the valve is shown diagrammatically as being controlled through instrument 59 by the level in hopper 39.

As a safety precaution to prevent the possibility of regenerating gas passing upwardly through the standpipe and intermixing with oil vapors, a second safety valve 61 is preferably provided. This valve may be operated automatically to close when the level of powder in the hopper 39 drops below a predetermined point or it may be designed to close automatically when the pressure below the valve 58 approaches or equals the pressure above the valve 58.

The spent catalyst segregated from the cracked products is fed into a stream of regenerating gas which may be air or air diluted with a suitable inert gas, such as steam, carbon dioxide, nitrogen, or the like, introduced into the system through line 65. Regenerating gas is placed under sufficient pressure by means of a blower or other similar device (not shown) for forcing the stream of regenerating gas and catalyst through the regenerating circuit. A suspension of regenerating gas and catalyst to be regenerated is formed in conduit 66 and passed through line 67 to a regenerating chamber 68 (see Fig. 1)

which is preferably of a construction similar to the cracking chamber 29.

The regenerating chamber 68 is also preferably of such dimensions that the flow of suspension through the chamber is relatively slow so that considerable slippage occurs between the powder and the gases. The velocity of the gases, however, is greater than the average rate of settling so that the gases may be used to carry the catalyst through the regenerating system. Consequently, as in the cracking chamber 29 the resident time of the catalyst in the regenerating zone is materially greater than the resident time of the regenerating gas therein. The suspension of powdered catalyst and regenerating gas upon being introduced into the regenerating chamber 68 is admixed with cooled regenerated catalyst introduced through conduit 69 as later described. The amount of regenerated catalyst introduced into the regenerating chamber is regulated to control the temperature in the regenerating chamber below a value which would permanently impair the activity of the catalyst. The catalyst, during its passage through the regenerating chamber, is subjected to oxidation reaction to burn off carbonaceous deposits formed thereon during the cracking operation. The suspension of regenerated catalyst and gas, after passing through the regenerating chamber 68, is conducted through line 71 to a primary cyclone separator 72 in which the bulk of the regenerated catalyst is segregated from the regenerating gas.

The density of the stream passing through line 71 may be a measured by the pressure drop through a Venturi nozzle 73 located therein and this measurement may be utilized for regulating the flow through the regenerator 68.

The regenerated catalyst separated in the primary cyclone separator 72 may discharge directly into a catalyst hopper 74. To this end the cyclone separator 72 may be built into the upper section of the catalyst hopper as illustrated. The regenerating gas is removed from the primary separator 72 through line 75 and is passed to a secondary cyclone separator 76 wherein further removal of the catalyst from the regenerating gas is obtained. Catalyst separated in the secondary cyclone separator 76 discharges through line 77 having the lower end thereof submerged below the level of catalyst maintained in the catalyst hopper 74.

Regeneration gases from the secondary cyclone separator 76 pass through line 78 into a tertiary cyclone separator 79 wherein further removal of regenerated catalyst from the gas is obtained.

Catalyst separated in the tertiary cyclone separator 79 is discharged through line 81 into the catalyst hopper 74 at a point below the level of the catalyst maintained therein. By submerging the ends of the catalyst discharge lines 77 and 81 below the level of the catalyst in the hopper 74, a seal is maintained preventing gas from the catalyst hopper passing in a reverse direction through the secondary and tertiary cyclones.

The regenerating gas from the tertiary cyclone separator 79 is passed through line 82 to heat exchanger 11 wherein it passes in heat exchange relation with fresh oil to be cracked as previously described. The advantage of the heat exchanger 11 is not only to preheat the oil but to cool the regenerating gases to a point where they may be passed to an electrical precipitator for complete removal of the powdered material. For example, the regenerating gas during passage through heat exchanger 11 may be cooled from a temperature of 1000° down to 700° before passing to the electrical precipitator.

Regenerating gas, after passing through the heat exchanger 11, is transferred through line 83 to an electrical precipitator 84 for further purification of the gas prior to releasing the same to the atmosphere. This electrical precipitator may be of any conventional construction. Catalyst precipitated in the electrical precipitator 84 discharges through line 85 into the catalyst hopper 74 at a point below the level of the material therein. The regenerating gas, after having been substantially purified by means of the cyclone separators and electrical precipitators, is rejected from the system through line 86. This gas may, if desired, be passed to a suitable waste heat boiler or other heat recovery system for removal of heat before being released to the atmosphere.

The regenerated catalyst collected in the hopper 74 discharges continuously into a pair of standpipes 87 and 88. The standpipe 88 should have a height sufficient to produce a pressure at the bottom thereof sufficient to feed the catalyst into the stream of oil vapors to be cracked which in turn must be at least sufficient to overcome the pressure drop through the cracking equipment.

The standpipe 87 should also be of a height sufficient to develop a pressure at the bottom adequate to return the catalyst to the regenerating zone.

In order for the standpipes to be effective for developing pressure, it is important that the catalyst maintained therein be in a freely flowing state therein. To this end, a fluidizing gas may be introduced at one or more spaced points in standpipes 87 and 88 through lines 90 to 93, inclusive, and 94 to 96, inclusive, respectively.

The catalyst maintained in the standpipe 88 is adapted to be returned to the cracking circuit. To this end the bottom of the standpipe 88 may be provided with valve 97 for regulating the flow of catalyst into the stream of oil vapors in conduit 27.

The valve 97 may be regulated manually but is preferably controlled to maintain the desired catalyst-oil ratio as measured by the Venturi nozzle 33.

Also, as shown, a second or safety valve 99 may be placed at the bottom of the standpipe 88 to prevent the possibility of oil vapors from line 27 passing through standpipe 88 and intermingling with regenerating gas. To this end the valve 99 may be made to close automatically when the level in standpipe 88 or hopper 74 drops below a predetermined point or when the difference in pressure between opposite sides of the valve 97 reaches a specified minimum.

Catalyst collected in the standpipe 87 is adapted to be returned to the regenerating chamber for regulating the temperature therein.

To this end, a portion of the catalyst collected in the standpipe 87 may be passed through valve 103 and line 104 to the cooler 13 where it passes in heat exchange with fresh oil to be distilled and cracked and thence back to the regenerating zone 68. If desired, a portion of the catalyst returned to the regenerating zone may by-pass the cooler 13 through valve 105 and line 106. If desired, air or other regenerating gas may be introduced through line 107 into the stream of regenerated catalyst being circulated through cooler 13 or through line 108 into the line 106 by-passing the cooler or both to serve as a carrier for the catalyst being returned.

By regulating the relative amounts of cooled regenerated catalyst and uncooled regenerated catalyst returned to the regenerating chamber through lines 104 and 106, respectively, a careful control of temperature within the regenerating chamber may be obtained.

In many cases the amount of heat which must be removed from the catalyst during regeneration is in excess of that required to preheat the oil feed to the desired temperature. Furthermore, it is desirable from a practical standpoint to feed the oil to the vaporizing coil 16 at a uniform temperature regardless of the amount of heat liberated in the regenerating zone.

As shown in the drawing, a part of the oil, after passing through the heat exchanger 13, may be passed through line 111 to a waste heat boiler 112 wherein the oil may be cooled and steam generated. The oil, after passing through the waste heat boiler 112, may be returned to the inlet side of the heat exchanger 13 by means of pump 113 and line 114.

By regulating the amount of oil passing through the waste heat boiler 112 a uniform temperature of feed passing to the vaporizing coil 16 may be maintained without affecting the amount of cooling carried out in the catalyst cooler 13.

From the above description, it will be apparent that all of the pressure necessary for introducing the catalyst into the stream of reaction gases and regenerating gases is obtained from vertical columns of catalyst rather than by the use of mechanical devices.

For better understanding of the invention, the following examples may be of help, it being understood that the values and conditions given therein are illustrative rather than limitive.

Reduced crude to be treated introduced into the system through line 10 may be preheated in the heat exchanger 11 from an initial temperature of 400° to 450° F. to a temperature of from 450° to 500° F. and the catalyst cooler 13 to a temperature of from 650° to 750° F., usually 700° F., prior to passing to the vaporizer 16. The oil during its passage through the vaporizing coil 16 is heated to a temperature of from 800° to 900° F., usually 850° F. The oil then passes from vaporizer coil 16 to the separator where from 60 to 95% passes overhead as vapors. The vapors from the separator pass through a superheater where they are further heated to a temperature of from 850° to 950° F., preferably 900° F.

The amount of pressure imposed upon the oil vapors should be sufficient to overcome the resistance through the cracking circuit and the fractionating system. In cracking apparatus of commercial size employing the type of reactor previously described, a pressure of an atmosphere gauge is ordinarily sufficient.

The catalyst introduced into the stream of oil vapors may be any active cracking catalyst, such as naturally active or activated clays and particularly acid treated clays, or it may be synthetic gels or other adsorptive catalysts of the same or different chemical composition, such as synthetic silica-alumina gels, silica-magnesia gels, and mixtures thereof.

The amount of catalyst introduced into the oil vapors may range from 0.1 to 20 parts of catalyst per part of oil by weight. When employing acid treated bentonitic clays, the ratio may be 4 parts catalyst per part of oil. The temperature of the catalyst introduced into the oil stream is preferably substantially the final regenerating temperature which may be in the order of 1000° to 1100° F. so that the resulting equilibrium temperature of the catalyst and oil vapors may be between 900° F. and 1000° F.

The height of the standpipe 88 from which the catalyst is fed into the oil stream should be sufficient to develop a head of pressure adequate to feed the catalyst into the stream of oil vapors. In a specific instance where activated clay is employed as a catalyst and when the column is properly fluidized by addition of fluidizing gas along the standpipe, from 4 to 6 feet of fluidized catalyst are required for each pound of pressure. In the specific case wherein the oil vapors are under a pressure of one atmosphere gauge and where the pressure at the top of the standpipe 88 is of the order of 3 pounds per square inch, the minimum height of the standpipe will be of the order of 50 feet and is preferably 100 feet or more. In order to insure proper control of the catalyst feed into the oil stream, it is necessary to maintain a pressure differential across the control valves of from 2 to 5 pounds per square inch.

The velocity of the oil stream passing through the cracking zone 29 is preferably below 8 feet per second and may, for example, be of the order of about 2 feet per second. When these low velocities are maintained, the concentration of catalyst within the reaction zone is materially greater than the concentration of catalyst in the stream passing to the reaction zone. For example, when the velocity of oil vapors of 2 feet per second is employed, the concentration of catalyst within the cracking zone may build up to 10 pounds per cubic foot of reaction space. Under such circumstances the resident time the catalyst is retained in the reaction zone may be about 3 minutes, whereas the resident time of the oil vapors will be in the order of 10 seconds.

The cracked vapors and spent catalyst pass to the primary cyclone separator at a temperature of from 850° to 950° F. The pressure drop from the point where the catalyst is introduced into the oil vapors through the cracking chamber up to the primary cyclone where the catalyst is separated may be of the order of 5 pounds per square inch. In such case the oil vapors passing to the fractionating tower will be under a positive pressure of about 10 pounds per square inch. As a result, no additional pressure need be imposed to accomplish the subsequent fractionation and stabilizing treatment.

The height of the standpipe 52 which feeds the catalyst into the regenerating gas should be sufficient to produce a head of pressure at the bottom which will feed the spent catalyst into a stream of regenerating gas which in turn must be under sufficient pressure to carry the mixture through the regenerating circuit. This pressure may, for example, be of the order of 12 to 15 pounds per square inch gauge. In such case, when the back pressure on the hopper 39 is of the order of 10 pounds per square inch gauge, the height of the standpipe 52 may be of the order of from 30 to 60 feet to insure a proper differential across the control valves.

The catalyst and regenerating gas passing to the regenerating chamber 68 are commingled with cooled regenerated catalyst recycled through standpipe 87 and cooler 13 in such proportions that the equilibrium temperature of the mixture introduced into the regenerator is of the order of 900° F. The temperature, however, will be controlled by the amount of catalyst being recirculated through the cooler and the amount by-passing the cooler to prevent the temperature within the reactor from exceeding a point which would permanently impair the activity of the catalyst. In the case of activated clays previously mentioned, the maximum permissible temperature in the regenerating zone may be of the order of 1050° F.

The velocity of regenerating gas passing through the regenerating zone may be substantially the same as that of the oil vapors passing through the cracking zone, such as from 1 to 8 feet per second. Under such conditions the resident time of catalyst in the regenerating zone may be from one minute to 5 minutes and the resident time of the regenerating gas in the regenerating zone may be from 2 to 60 seconds.

The suspension of regenerated catalyst and regenerating gas is separated in the cyclone separators and electrical precipitators at a temperature approximating the temperature obtained during regeneration, which may be of the order of 1000° to 1100° F. as previously described.

The height of the standpipe 87 for returning catalyst through cooler 13 and back into the stream of unregenerated catalyst passing to the regenerator should be sufficient to overcome the pressure drop through the cooler, regenerating chamber and connecting conduits.

It may be helpful to mention at this point that the circulation of the powder from the point of highest elevation back to the same point is made possible by the fact that the density of the stream in the return leg is lower than in the opposite leg. The pressure differential between the top and bottom legs may be expressed by the formula $DP = dh$, where $d$ is the density of the material and $h$ the distance from top to bottom.

In order for the powder to circulate in the system, $d_1 h_1$ must be greater than $d_2 h_2$, where $d_1 h_1$ is the density and height of material on the down leg and $d_2 h_2$ the density and height of material on the return leg. $d_2$ is reduced by introducing reaction or regenerating gas on one side of the circuit. The same result might also be accomplished by application of heat on one side to reduce density.

In order for the powdered material to seek its own level and otherwise behave as a liquid, the solid must be in finely-divided form and each particle should preferably be surrounded by a film of gas. Particle sizes smaller than 200 mesh are usually preferred.

While the invention has been described as applied to the catalytic cracking of hydrocarbon oils, in which process it finds particular application, the same general procedural steps apply to other types of hydrocarbon reactions with or without the presence of extraneous gas, such as hydrogen, although the specific operating conditions will usually vary from that just described.

For example, in the reforming of gasoline to improve octane number, the catalyst may be a carrier, such as alumina or magnesia, preferably in adsorptive form containing oxides or sulfides of the metals of groups III to VIII, preferably the metals or group VI. The temperature may range from 900° to 1400° F. and the contact time from 2 to 60 seconds. The pressures employed may range from atmospheric to 400 pounds per square inch.

With respect to pressure, it will be understood that the system may be operated under any desired pressure since the standpipes are employed to produce enough pressure to overcome the pressure drop in the system.

In case hydrogen is employed in reforming, some provision is necessary to recycling excess hydrogen.

When dehydrogenating gases are employed, the same general type of catalyst is employed as in reforming. The temperature may be somewhat higher, such as from 700° to 1400° F. and the pressure may be somewhat lower and may range from subatmospheric pressure to 200 pounds per square inch.

In the alkylation of olefins with branched chain paraffins, active cracking catalysts may be employed. One particularly suitable catalyst is a complex sodium-aluminum chloride. The pressure may be of the order of 500 to 3000 pounds per square inch.

In hydrocarbon processes involving isomerization of straight chain to branched chain paraffins, sodium-aluminum chloride may be used as a catalyst or anhydrous aluminum chloride or boron fluoride supported on adsorptive carriers, such as activated charcoal, natural or activated clays, synthetic gels, or the like. The temperature may be of the order of 200° to 300° F. and the pressure from atmospheric to 300 pounds per square inch.

For isomerizing olefins, activated clays, bauxite, and activated aluminas may be employed as catalysts and the temperature may be from 575° to 1000° F.

In catalytic refining of hydrocarbons to remove gum-forming constituents, sulfur and other impurities, activated alumina, alumina gel, naturally active or activated clays with or without the presence of other metal oxides may be used as a catalyst. In such processes, the temperature is below active cracking temperature, such as from 400° to 800° F.

For reactions involving hydrogenation, pressures upwards of 300 pounds per square inch should be employed. Temperatures upwards of 700° F. may be employed with a catalyst consisting of finely-divided nickel, tungsten, molybdenum, or the oxides and sulfides thereof. Also other known hydrogenating catalysts may be employed.

For example, in some variations of the catalytic cracking process or in some other processes using the above invention, the amount of heat liberated in regeneration may be relatively small and the range of desirable operating temperature from inlet to outlet may be relatively large so that it is feasible to cool the stream of fluidized spent catalyst prior to its induction into the regenerator and omit the recycling of regenerated catalyst from the standpipe containing regenerated catalyst to the regenerator.

In some cases it may even be desirable to heat the regenerated catalyst recycled to the reactor rather than to cool.

Also, in some processes using the above invention, the amount of heat absorbed in the treating step may be relatively large and the range of desirable operating temperature from inlet to outlet may be relatively small so that it is desirable to add to the apparatus above described equipment, not shown, to permit recycling catalyst from the spent catalyst standpipe through indirect heat exchange equipment or other means (to put heat into the stream) back into the reactor.

While we have shown the step of stripping the catalyst recovered in the primary cyclone 34, in many cases this step may be omitted.

For lack of a better name, the term "fluistatic" as employed in the claims is intended to be synonymous with "hydrostatic," except that it is not limited to liquids but applies also to finely-divided solids which in fluidized state behave in many respects as a liquid.

Having described the preferred embodiment of the invention, it is understood that it embraces such other variations and modifications as come within the spirit and scope thereof.

This application forms a division of our earlier application Serial No. 691,862, filed August 20, 1946, and now abandoned, which in turn forms a division of our earlier application Serial No. 359,854, filed October 5, 1940, and issued as U. S. Patent No. 2,451,803 on October 19, 1948.

What is claimed is:

1. In a catalytic conversion apparatus including a conversion chamber and a catalyst reactivation chamber, and a closed cyclic catalyst path therebetween including a vertical conduit, means for passing catalyst from one of said chambers to the upper end of said conduit, means for discharging the catalyst from the lower end of said conduit to the other of said chambers, means for introducing fluidizing gas into said conduit to fluidize the catalyst therein, said conduit being constructed to form a fluidized column of the received catalyst and to maintain a required pressure differential between said chambers by sealing effect of the fluidized catalyst column, and a level control device responsive to fluctuations in the level of the fluidized catalyst column to control said discharge of the catalyst from the conduit for retention of a head of catalyst sufficient for maintaining said pressure differential.

2. In a catalytic conversion apparatus including a conversion chamber and a catalyst reactivation chamber, and means forming a closed cyclic catalyst circuit therebetween including a vertical path as a substantial portion thereof, means for passing catalyst from one of said chambers to the upper end of said vertical path, means for accumulating and discharging the catalyst from the lower end of said vertical path to the other of said chambers, means for fluidizing the catalyst in said vertical path, said vertical path portion being constructed to form a fluidized column of the received catalyst and to maintain a required pressure differential between said chambers by sealing effect of the fluidized catalyst column, and a level control device connected to said vertical path and said accumulating and discharging means responsive to fluctuations in height of said fluidized catalyst column to control said discharge of the catalyst from the vertical path.

3. In a catalytic conversion apparatus including a conversion chamber and a catalyst reactivation chamber, and a closed cyclic catalyst path therebetween, a vertical portion thereof including a conduit, and upstanding receiving means for passing catalyst from said conversion chamber to the upper end of said conduit, means for introducing fluidizing gas into catalyst in said conduit to fluidize the catalyst therein, means for accumulating and discharging the catalyst from the lower end of said conduit to said catalyst reactivation chamber, said upstanding means and said conduit being constructed to form a column of fluidized catalyst and to maintain a required pressure differential between said chambers by sealing effect of the fluidized catalyst column, and a level control device connected to said upstanding means and said accumulating and discharging means responsive to fluctuations in the level of the fluidized catalyst column to control said discharge of the catalyst from the conduit.

4. In a hydrocarbon conversion apparatus including a conversion chamber and a heating chamber and a closed cyclic solids path therebetween including a vertical conduit, means for passing finely divided solids from one of said chambers to the upper end of said conduit, means for discharging finely divided solids from the lower end of said conduit to the other of said chambers, means for introducing fluidizing gas into said conduit to fluidize the finely divided solids therein, said conduit being constructed to form a column of the received finely divided solids and to produce hydrostatic pressure and to maintain a required pressure differential between said chambers by sealing effect of the fluidized column of finely divided solids, and a level control device responsive to fluctuations in the level of the fluidized solids column to control the discharge of finely divided solids from said conduit for retention of a hydrostatic head of finely divided solids sufficient for maintaining said pressure differential.

5. An improved process for control of temperature in a vapor phase chemical reaction involving large heat effects comprising passing a stream of the reagents through a reaction zone maintained at the desired reaction temperature, simultaneously maintaining a vertical column filled with a finely divided solid catalytic material, keeping said catalytic material within said column in an aerated freely flowing, fluidized state, thereby freely to transmit pressure to the base of said column, transferring said catalytic material from the base of said column into a stream of gas, passing the resulting mixture of gas and catalytic material through a temperature-adjusting zone and then into said reaction zone in contact with said reagents, the temperature of said catalyst, during passage through said temperature-adjusting zone, being adjusted to be sufficiently different from the temperature prevailing in said reaction zone to substantially offset the heat effects of said reaction and thereby to aid in the control of the temperature in said reaction zone, withdrawing catalyst from the reaction zone and passing catalyst so withdrawn to the top of said column.

6. A method of regenerating finely divided catalyst containing combustible deposits which comprises introducing a stream of said solids containing said combustible deposits into an enlarged regenerating zone, passing an oxidizing gas through said zone, maintaining said regenerating zone at a temperature sufficient to burn combustible deposits from said catalyst, removing a stream of regenerated catalyst from said regenerating zone, maintaining a column of catalyst so removed, maintaining an aerating gas in admixture with said catalyst within said column in amount controlled to maintain the catalyst in a quasi-liquid state capable of generating a pressure at the base thereof, maintaining the column of a height which will generate a pressure sufficient to return the regenerated catalyst to the regenerating zone, transferring catalyst from the regenerating zone to the top of said column, delivering catalyst from the base of said column to the regenerating zone and cooling the catalyst prior to delivery to said regenerating zone.

7. An improved process for control of temperature in a chemical reaction in the presence of finely divided solid material fluidized by an upflowing gasiform fluid involving large heat effects comprising passing a stream of reactant material into a reaction zone maintained at the desired reaction temperature, simultaneously maintaining a vertical column filled with finely divided solid material, keeping said finely divided solid material within said column in an aerated freely flowing, fluidized state, thereby freely to transmit pressure to the base of said column, transferring said finely divided solid material from the base of said column into a stream of gas, passing the resulting mixture of gas and finely divided solid material through a temperature-adjusting zone and then passing said solid material into said reaction zone to contact said reactant material, the temperature of said finely divided solid material, during passage through said temperature-adjusting zone, being adjusted to be sufficiently different from the temperature prevailing in said reaction zone to substantially offset the heat effects of said reaction and thereby to aid in the control of the temperature in said reaction zone, withdrawing finely divided solid material from the reaction zone and passing said finely divided solid material so withdrawn to the top of said column.

No references cited.